(12) United States Patent
Khelifa et al.

(10) Patent No.: US 6,260,376 B1
(45) Date of Patent: Jul. 17, 2001

(54) AIR CONDITIONING INSTALLATION FOR A MOTOR VEHICLE WITH A COLD RESERVOIR

(75) Inventors: Noureddine Khelifa, Coburg; Horst Riehl, Rodach, both of (DE)

(73) Assignee: Valeo Klimasysteme GmbH (DE)

( * ) Notice: Subject to any disclaimer, the term of this patent is extended or adjusted under 35 U.S.C. 154(b) by 0 days.

(21) Appl. No.: 09/472,318

(22) Filed: Dec. 23, 1999

(30) Foreign Application Priority Data

Dec. 23, 1998 (DE) ............................................. 198 60 057

(51) Int. Cl.⁷ ................................................... F25D 17/02
(52) U.S. Cl. .................. 62/435; 62/430; 62/434
(58) Field of Search ................ 62/434, 430, 435

(56) References Cited

U.S. PATENT DOCUMENTS

| | | | |
|---|---|---|---|
| 5,277,038 | * | 1/1994 | Carr ........................................ 62/434 |
| 5,421,169 | * | 6/1995 | Benedict ................. 62/244 |
| 5,524,442 | * | 6/1996 | Bergman, Jr. et al. .................. 62/86 |
| 5,711,155 | * | 1/1998 | DeVilbiss et al. ....................... 62/3.7 |
| 5,749,235 | * | 5/1998 | Ueda ....................................... 62/160 |
| 5,784,893 | * | 7/1998 | Furuhama et al. ...................... 62/333 |
| 5,823,010 | * | 10/1998 | Chao ...................................... 62/434 |
| 5,904,052 | * | 5/1999 | Inoue et al. ............................. 62/244 |
| 5,964,101 | * | 10/1999 | Schulak et al. ......................... 62/430 |
| 6,018,961 | * | 2/2000 | Venture et al. .......................... 62/434 |
| 6,053,006 | * | 4/2000 | Kimborn ................................. 62/434 |
| 6,067,814 | * | 5/2000 | Imeland ................................. 62/384 |

FOREIGN PATENT DOCUMENTS 1995 24 660   10/1996   (DE) .
196 29 114    1/1998    (DE) .

* cited by examiner

*Primary Examiner*—William Doerrler
*Assistant Examiner*—Mark Shulman
(74) *Attorney, Agent, or Firm*—Morgan & Finnegan, LLP

(57) ABSTRACT

Air conditioning installation for a motor vehicle with a cold reservoir, which can be charged via an evaporator of a primary circuit, and with a heat exchanger which can deliver cold stored in the cold reservoir via a secondary circuit to the interior of the vehicle, in which the secondary circuit contains at least one further heat exchanger, which is in a heat-exchanging relationship with the evaporator of the primary circuit and preferably also with the cold reservoir.

16 Claims, 6 Drawing Sheets

AIR CONDITIONING INSTALLATION FOR A MOTOR VEHICLE WITH A COLD RESERVOIR

BACKGROUND OF THE INVENTION

The present invention relates in general to an air conditioning installation for a motor vehicle, and in particular to an air conditioning installation for a motor vehicle with a cold reservoir, which can be charged with cold produced in an evaporator of a primary circuit.

An air conditioning installation with the characteristics of the preamble to claim 1 for a refrigerated goods vehicle is known from "Ki Klima-Kälte-Heizung", June/1988 page 286, paragraph 3.1. The air conditioning installation includes a cold reservoir, which is produced in the form of a water tank which can equally well serve as an ice container. The cold reservoir can be charged from an evaporator of a primary circuit, the primary circuit, in the known way, forming a cooling circuit, which contains a compressor unit, a condenser and an expansion unit, in addition to the evaporator. The air conditioning installation of the generic type described here further includes a heat exchanger, which can deliver cold stored in the cold reservoir to the interior of the motor vehicle via a secondary circuit. With the air conditioning installation described here, this heat exchanger is charged with ice water from the reservoir by a circulating pump via a water circuit. The known air conditioning installation exhibits relatively sluggish response characteristics, because the entire volume of the water held in the reservoir has to be cooled, before the desired cooling can be made available via the heat exchanger. Moreover, the growth of the ice in the reservoir has to be controlled, the ice production and melting having to be kept in balance while the vehicle is in operation.

In view of the above-described drawbacks, so-called installations with a secondary evaporator have been developed. Such an air conditioning installation is likewise known from "Ki Klima-Kälte-Heizung", June/1988 page 286, paragraph 3.3. In this implementation, two cooling circuits are generally provided. The primary cooling circuit, in the usual way, includes a compressor unit, a condenser, an expansion unit and a primary evaporator, the primary evaporator serving, while the vehicle is in operation, to make the desired cooling power available for the refrigerated goods vehicle. The second cooling circuit is formed from the compressor unit and the condenser of the primary circuit, supplemented by a further expansion unit and a secondary evaporator, which is contained in an ice/water cold reservoir. The two cooling circuits are laid out in such a way that the primary evaporator and the secondary evaporator are connected in parallel. The known air conditioning installation thus allows the following modes of operation, while the vehicle is operating: pure air cooling while the vehicle is operating, via the primary evaporator; cooling by means of the primary and secondary evaporator while the vehicle is operating (charging of the ice tank); charging of the ice tank while the vehicle is operating without cooling by means of the primary evaporator. With the internal-combustion engine turned off, the ice tank can be discharged via the primary evaporator when standing still by circulating the cooling fluid by means of an electric pump, in order to make cold available to the primary evaporator.

Such installations with a secondary evaporator are therefore relatively complex in construction, so that their application to refrigerated goods vehicles is restricted, in particular by the high space demands, brought about among other things by the parallel connection of primary evaporator and secondary evaporator provided in the cold reservoir. Furthermore, it is not possible with the solutions known hitherto to remove cold from the cold reservoir while the vehicle is operating, which would be desirable, for example at low engine speeds. Consequently, prior solutions provide only an interim solution. Hence, there is a need for an improved air conditioning installation, which, like the known installations with a secondary evaporator, permits full use of the storage medium, since not required for circulation, and which is nevertheless structurally simple in implementation and can therefore be integrated with low space requirements even into a private car.

BRIEF SUMMARY OF THE INVENTION

The object of the present invention is thus to develop a generic air conditioning installation of the type set out in the introduction in such a way that, with a relatively simple implementation, a high operating efficiency and rapid response is achieved. A further object of the invention is to develop a known air conditioning installation in such a way that, even when the vehicle is operating, cooling power can be drawn from the cold reservoir. The space required for fitting the air conditioning installation should be small, so that it is even possible to fit it into a private car.

In accordance with the invention, the above objectives are achieved with a known air conditioning installation for a motor vehicle with a cold reservoir, which can be charged from an evaporator of a primary circuit, and with an optional heat exchanger which can deliver cold stored in the cold reservoir via a secondary circuit to the interior of the vehicle, in that the secondary circuit contains at least one further heat exchanger, which is in a heat-exchanging relationship with the evaporator of the primary circuit and forms an evaporator/heat exchanger unit. Because the further heat exchanger is in a heat-exchanging relationship with the evaporator of the primary circuit, satisfactory response characteristics are guaranteed, with it being possible, depending on the operating conditions, for cold to be charged into the cold reservoir or removed from it. The evaporator/heat exchanger unit thus forms, in combination, a cold source for the vehicle air conditioning and a decoupled interface to the secondary circuit for storing surplus cold power or for drawing cold power from the reservoir, for example when the internal-combustion engine is turning at low speeds. To you [sic] invention makes it possible, in a simple way, to extend an existing direct evaporator air conditioning installation around the secondary circuit, and, by means of the cold reservoir, allows simple but effective air conditioning while stationary.

Advantageously, the further heat exchanger is in a heat-exchanging relationship with the evaporator of the primary circuit as well as with the cold reservoir. Because the further heat exchanger is in a heat-exchanging relationship with the evaporator of the primary circuit, satisfactory response characteristics are guaranteed. Since the further heat exchanger is additionally also in a heat-exchanging relationship with the cold reservoir, cold from the cold reservoir can be made use of with the engine stopped as well as at low engine speeds. Consequently, this solution makes available a structurally simple coupling between three temperature levels and/or cold sources, so that an overall engineering design with minimal space requirements is achieved, which it is even possible to install in a private car.

As regards the individual heating or cooling transfers, it should be mentioned that, depending on prevailing conditions and/or operating states, a predominant situation could exist. For example, it could be envisaged that the evaporator of the primary circuit be in a prioritized or exclusive heat-exchanging relationship with the further heat exchanger of the secondary circuit, such that the charging of the cold reservoir thus takes place with the further heat exchanger of the secondary circuit connected intermediately. It is therefore preferred for the evaporator of the primary circuit to be in a heat-exchanging relationship with the cold reservoir, essentially with the further heat exchanger of the secondary circuit connected intermediately.

In a preferred embodiment, the evaporator is essentially contained in the further heat exchanger of the secondary circuit, with the further heat exchanger of the secondary circuit essentially being able to be contained in the cold reservoir. As an example, a solution might be proposed in which a concentric arrangement exists, with the primary evaporator located innermost, the further heat exchanger of the secondary circuit as an intermediate element and the cold reservoir as a jacket. The person skilled in the art should recognize that a corresponding spiral implementation of evaporator and/or heat exchanger may improve the performance of the overall installation.

Advantageously, the evaporator of the primary circuit, the further heat exchanger of the secondary circuit and the cold reservoir are constructed as a unit. As a result of the unit construction, fitting can be simplified, such that, as already mentioned, only a minimum amount of space is required.

The secondary circuit preferably includes a pump and/or compressor unit, which can serve to circulate a fluid of the secondary circuit and/or to compress it thermodynamically.

The pump and/or compressor unit can advantageously be driven by an electric motor, and in particular can be selectably driven by an electric motor. By means of the electric-motor drive it is possible, for example by using the battery carried on the vehicle, for the fluid of the secondary circuit to be circulated, in order to achieve the desired air conditioning while stationary. In one particularly preferred embodiment with a selectable electric-motor drive for the pump and/or compressor unit, a mechanical coupling with the internal-combustion engine may additionally be present, so that, with the engine running, mechanical driving is possible, while, with the internal-combustion engine switched off, the electric-motor drive is available.

The secondary circuit may advantageously include an expansion unit, for thermodynamic pressure-reduction of the fluid of the secondary circuit. Additionally or alternatively, the secondary circuit may also have a metering and/or shut-off valve responding to a control system, supplementing or supporting the control facilities of the pump unit.

In a further preferred embodiment, the heat exchanger of the secondary circuit is implemented as an evaporator for a fluid of the secondary circuit. Put another way, the secondary circuit may be implemented as a separate decoupled cooling circuit, and the fluids of the primary circuit and of the secondary circuit should be correspondingly matched to one another, in view of the prevailing temperature levels.

Advantageously, the primary circuit includes at least one additional evaporator, which is in a prioritized and/or exclusive heat-exchanging relationship with the cold reservoir. By means of the provision of an additional evaporator, the operating efficiency for charging the cold reservoir can be increased, particularly when the cold power made available by the primary circuit is markedly in excess of that that required for cooling the vehicle interior.

It is advantageous, moreover, for the secondary circuit to contain at least one additional heat exchanger, which is in a prioritized and/or exclusive heat-exchanging relationship with the cold reservoir. By means of the additional heat exchanger, an interaction between cold reservoir and secondary circuit can be achieved which is essentially independent of the primary evaporator, for example when very low engine speeds are available, during which cold has to be taken from the cold reservoir for cooling the motor vehicle interior.

In order to allow operating-parameter-dependent admission into the individual heat-exchangers and/or evaporators contained in the cold reservoir, the primary circuit and/or the secondary circuit should be provided with bypass lines and/or regulating elements, in order to bypass individual evaporators and/or heat exchangers or to meter or shut off their fluid through-put. In the particularly preferred embodiment, the bypass lines should be connectable via regulating elements, for example in the form of valves. In this implementation, the regulating elements should also allow for partial fluid flow. Put another way, some of the fluid could be routed via the bypass line of the respective evaporator or heat exchanger, while some passes through the evaporator and/or heat exchanger in question. Simply as an example, a mode can be considered in which the secondary circuit is configured, by means of the regulating elements, such that the fluid of the secondary circuit passes exclusively through the additional heat exchanger, bypassing the further heat exchanger, in order to provide the desired cold from the cold reservoir to the heat exchanger in the motor vehicle. Hence, an air conditioning installation is provided, for use when stationary, which allows optimally efficient fluid routing dependent on prevailing conditions and/or operating parameters, both as regards the primary circuit as well as the secondary circuit.

Finally, it is preferred for the secondary circuit to be able to be driven in a counter-current mode in relation to the primary circuit. By operating in counter-current mode, the operating efficiency can be raised, particularly as regards the transmission between primary evaporator and further heat exchanger.

BRIEF DESCRIPTION OF THE DRAWINGS

Further advantages and characteristics of the present invention will emerge from the following non-restrictive exemplary description of a presently preferred embodiment, with reference to the attached drawings, in which.

DETAILED DESCRIPTION OF THE INVENTION

Figure 1:
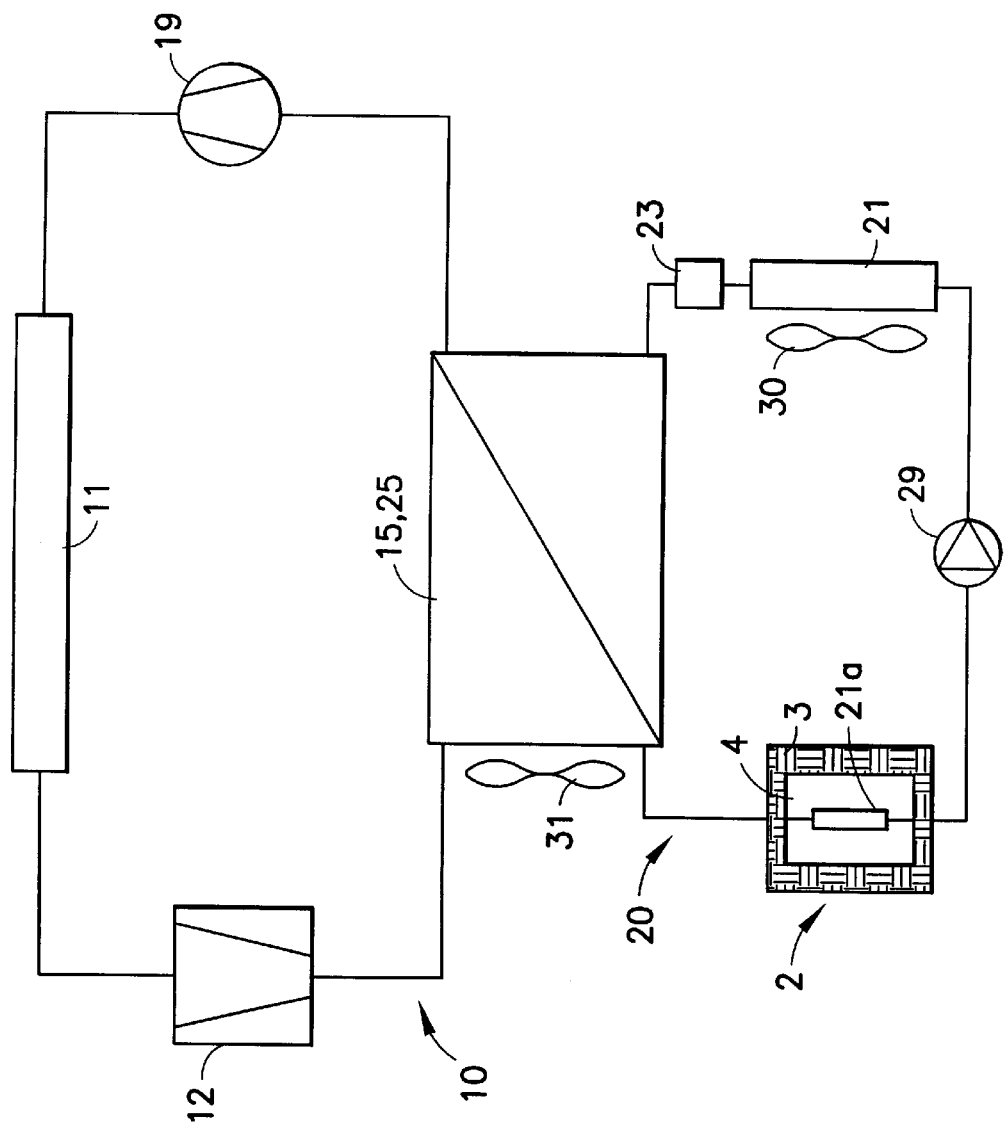
FIG. 1 diagrammatically shows the construction of a first preferred embodiment of the air conditioning installation according to the invention.

An air conditioning installation is depicted diagrammatically in FIG. 1 as a first preferred embodiment of the invention. The air conditioning installation shown can particularly be employed as air conditioning for use when stationary and as a central cold supply, for example for a refrigerated goods vehicle or even a private car. The embodiment shown consists essentially of a primary circuit 10 and a secondary circuit 20, which interact to transfer cold via an evaporator/heat exchanger unit 15, 25, in which case, otherwise, there is complete decoupling between the primary circuit 10 and the secondary circuit 20. The evaporator/heat exchanger unit 25 may serve directly for air conditioning the interior of the vehicle both when the vehicle is travelling as well as when the internal-combustion engine is switched off, and for this purpose a blower 31 can be arranged to blow over it.

The primary circuit 10 is configured as a conventional cooling circuit, and, in addition to an evaporator 15, which is part of the evaporator/heat exchanger unit 15, 25, includes a compressor unit 19, a condenser 11 and an expansion unit 12. In this way, when the vehicle is moving, cold power is made available via the primary circuit 10 and will be made available wholly or in part to the vehicle interior via the evaporator 15 as a result, for example, of an air flow being generated by the fan 31.

The secondary circuit 20, in the embodiment depicted, is provided with a cold reservoir 2 and a heat exchanger 21 which can have a blower 30 blowing over it. In the embodiment shown, the secondary circuit 20 is configured as a circulation loop, in which a circulation pump 29 is provided. The person skilled in the art will recognize that the secondary circuit could also alternatively be configured as a stand-alone cooling circuit if an additional expansion unit is provided and the cooling fluids in the primary circuit 10 and the secondary circuit 20 are correspondingly matched to each other.

For charging the cold reservoir 2, the secondary circuit 20, via a further heat exchanger 25, part of the evaporator/heat exchanger unit 15, 25, can draw cold power from the primary circuit 10. The cold power drawn from the further heat exchanger 25 is delivered via an additional heat exchange [sic] 21a to the cold reservoir 2 when the primary circuit 10 makes excess cold power available. In the embodiment shown, the cold reservoir 2 is depicted as an ice water tank, formed from insulation 3 and a cooling medium 4, which in the embodiment shown may be water, as mentioned.

In the embodiment shown, the secondary circuit 20 also contains an optional control or governing element 23, which can control or govern the fluid flow in the secondary circuit 20.

At low engine speeds, i.e. when the primary circuit cannot make sufficient cold power available, the secondary circuit can make cold stored in the cold reservoir 2 available for cooling the interior of the vehicle via the further heat exchanger 25 and/or the heat exchanger 21. With the internal-combustion engine switched off, the secondary circuit 20 will make the cold stored in the cold reservoir 2 available for air conditioning while stationary, substantially via the heat exchanger 21. In this case, however, a small part of the cold power available is delivered to the evaporator/heat exchanger unit 15, 25 via the further heat exchanger 25, so that, when the internal-combustion engine is started again, practically instantaneous cooling is available via the primary circuit 10. Hence, this solution markedly improves the response times of the air conditioning installation as a whole, provided that the cold reservoir 2 is configured for bridging the stationary phase.

In summary, it can be stated that the embodiment shown in FIG. 1 depicts a structurally simple and optimally efficient air conditioning installation in which, in addition to the heat coupling, practically complete separation between primary circuit 10 and secondary circuit 20 is provided. This separation thus allows the use of different fluids in the primary circuit 10, the secondary circuit 20 and the cold reservoir 2. The evaporator/heat exchanger unit 15, 25 is thus available, as linking component between primary circuit 10 and secondary circuit 20, for immediate cooling of the vehicle interior, so that practically no losses occur. By means of the air conditioning installation depicted, excess cold power can be effectively stored, and recovered when required.

Figure 2:
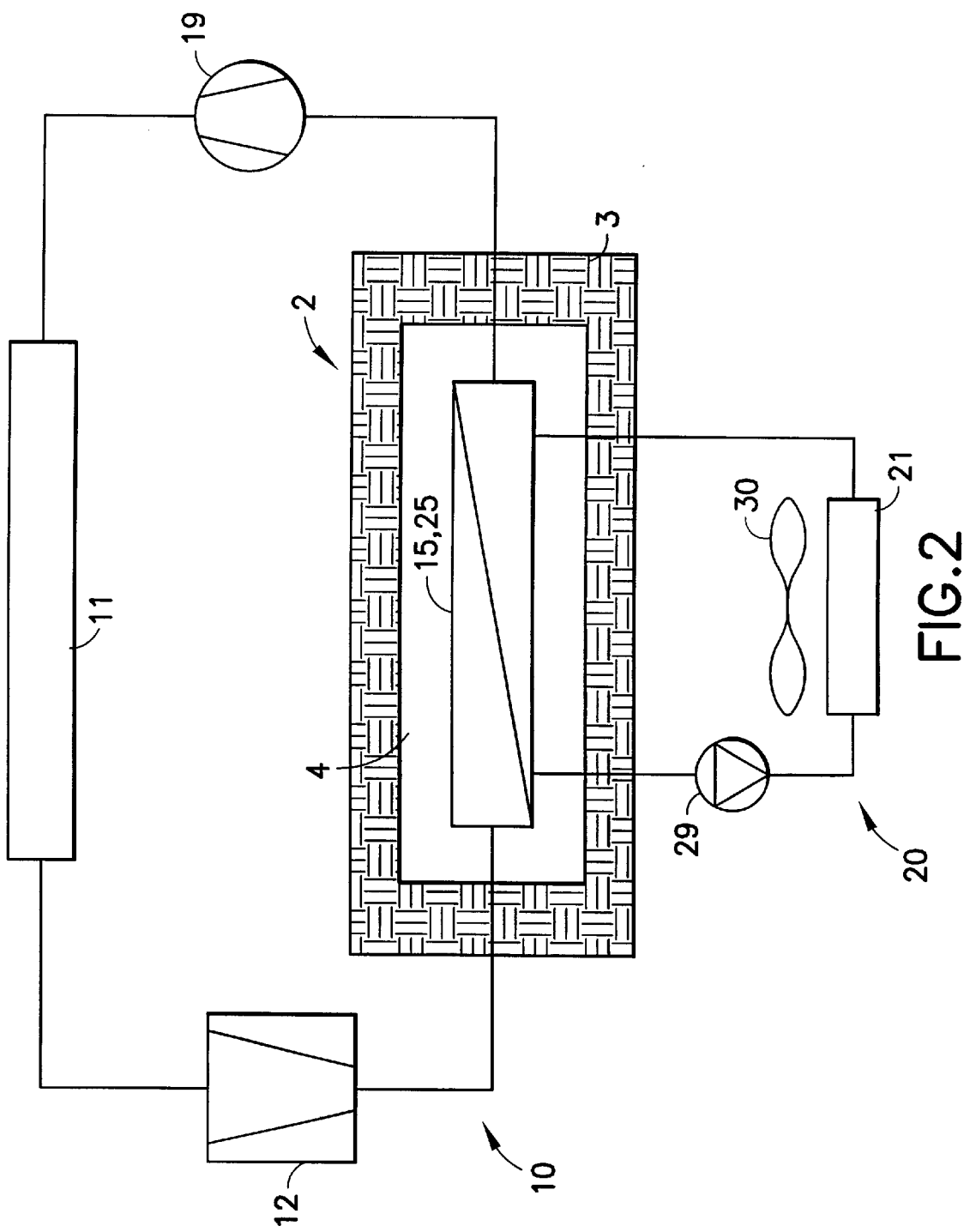
FIG. 2 diagrammatically shows the construction of a second preferred embodiment of the air conditioning installation according to the invention.

FIG. 2 is a diagrammatic illustration of an air conditioning installation as a second preferred embodiment of the invention, where the air conditioning installation shown can be used as air conditioning while stationary and as a central cold supply for, by way of example, a refrigerated goods vehicle, or also for a private car. In a manner which is known per se, the air conditioning installation comprises a primary cooling circuit 10, containing a compressor 19, a condenser 11, an expansion valve 12 and an evaporator 15 in that order. The evaporator 15 in the primary circuit 10 is arranged in a cold reservoir 2 which, by way of example, has water as the storage medium 4, contained within insulation 3. The cold reservoir 2 in itself forms a closed system, that is to say that the storage medium 4 can be used entirely for storing cold.

The interior of the vehicle is provided with a heat exchanger 21 which can have a blower 30 blowing over it and is used for cooling the interior of the vehicle. The heat exchanger 21, which is absolutely necessary in this embodiment, is a component part of the secondary circuit 20, which can be subjected to the action of an electric pump 29 in the embodiment shown. In the embodiment shown, the secondary circuit 20 also comprises a further heat exchanger 25, which is arranged in the cold reservoir 2 like the evaporator 15 in the primary circuit 10. In the embodiment shown, the evaporator 15 in the primary circuit 10 and the heat exchanger 25 in the secondary circuit 20 are combined with one another and can be seen overall as a counter-current heat exchanger. Accordingly, in the embodiment shown, both the evaporator 15 and the heat exchanger 25 are in a heat-exchanging relationship with the reservoir medium 4 in the cold reservoir 2, and are additionally in a heat-exchanging relationship with one another. As shown, the cold reservoir 2, the evaporator 15 and the further heat exchanger 25 form a structural unit which allows space-saving assembly.

The cold power available at the heat exchanger 21 is substantially dependent on the configuration of the structural unit formed by the cold reservoir 2, the evaporator 15 and the further heat exchanger 25. The person skilled in the art of heat exchangers will recognize that there are a wide variety of design possibilities. For example, the entire arrangement could be designed such that, while the engine is running, that is to say when the primary circuit 10 is being operated, the evaporator 15 provides a particular cold power which can be proportionately transferred to the cold reservoir 2 and the further heat exchanger 25. When the further heat exchanger 25 is itself also in a heat-exchanging relationship with the cold reservoir 2, the proportion of cold power transferred from the evaporator 15 to the further heat exchanger 25 should be larger, so that sufficient cold power remains at the heat exchanger 21 for the secondary circuit 20, despite the transfer of cold from the further heat exchanger 25 to the cold reservoir 2. In this regard, it should be mentioned that, with the prioritized heat-exchanging relationship between the evaporator 15 and the further heat exchanger 25, the system's overall inertia, caused by the cold reservoir 2, can be drastically reduced.

However, when, as shown, three different fluids are in a heat-exchanging relationship, namely the cold medium in the primary circuit 10, the fluid in the secondary circuit 20 and the reservoir medium 4, losses can practically be avoided, allowing technically improved control in the overall process as a result of the further heat exchanger 25 being able to draw additional cold power from the cold reservoir 2, for example when the internal-combustion engine driving the primary circuit 10 is running at a low engine speed, in order to provide sufficient cold power at the vehicle heat exchanger 21.

Figure 3:
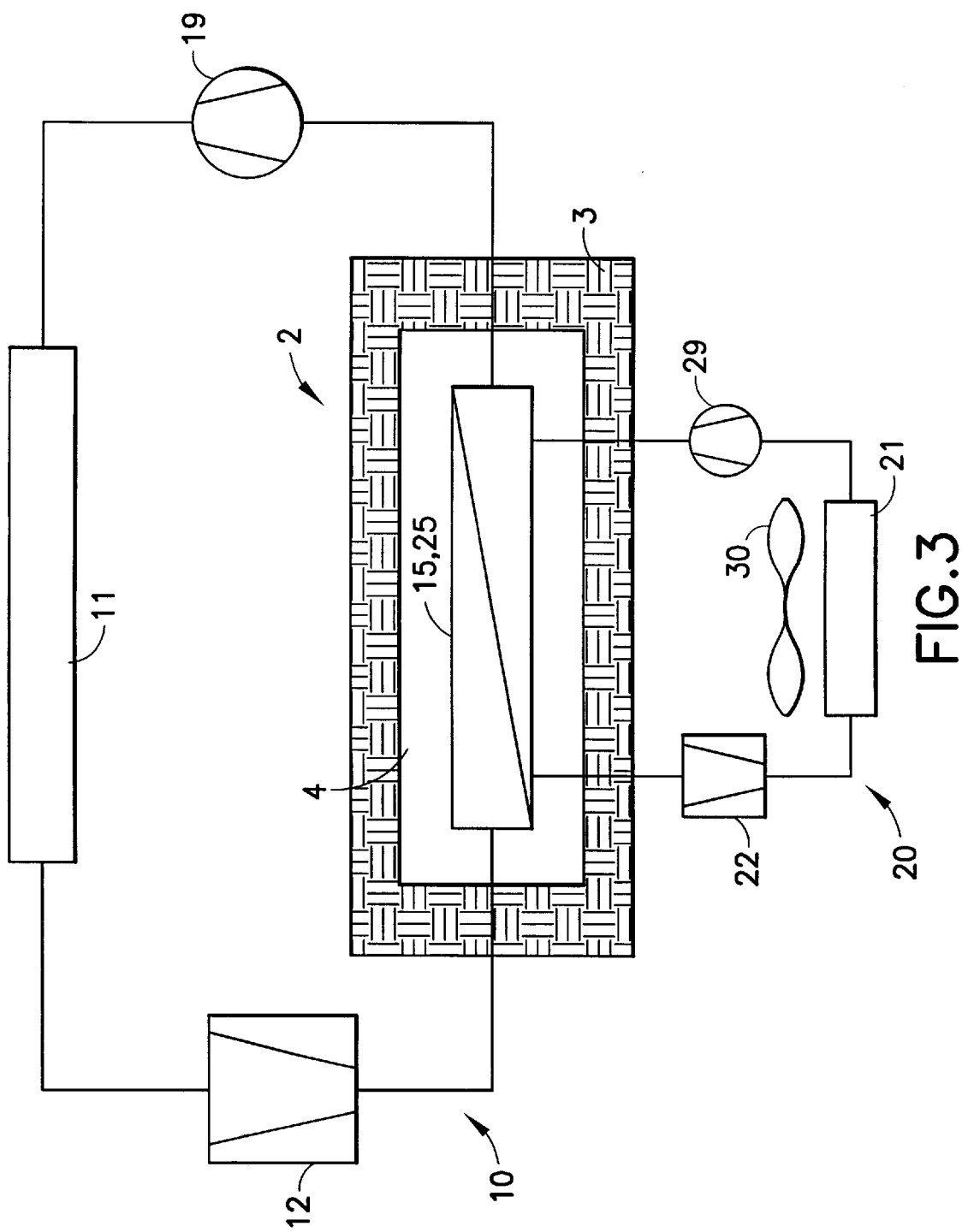
FIG. 3 shows a view similar to FIG. 2 of a modified embodiment.

The embodiment shown in FIG. 3 is a modification of the embodiment shown in FIG. 2. This embodiment is also used as air conditioning when stationary and a central cold supply for, by way of example, a refrigerated goods vehicle or even a private car. In the embodiment shown here, the secondary circuit 20 itself forms a cold circuit comprising an expansion valve 22 and a compressor 29. In this embodiment, the heat exchanger 21 is in the form of an evaporator for the fluid in the secondary circuit 20, while the further heat exchanger 25, contained in the cold reservoir 2, is used as a condenser for the same fluid. The person skilled in the art will recognize that this solution is possible using a suitable selection of fluids in the primary circuit 10, the secondary circuit 20 and the cold reservoir 2. It should be mentioned that designing the secondary circuit 20 as a cold circuit allows a significant increase in operating efficiency. Furthermore, the cold available for the vehicle can itself be achieved if the temperature in the cold reservoir 2 is above the desired cooling temperature. The statements made with respect to the heat-exchanging relationships between the evaporator 15, the further heat exchanger 25 and the cold reservoir 2 for the embodiment shown in FIG. 2 can accordingly also be transferred to the embodiment shown in FIG. 3 and are therefore not repeated for the sake of more succinct illustration.

As stated, predominant transfer of cold from the evaporator 15 to the further heat exchanger 25 should be provided for the embodiments described above, right down to exclusive interrelation, in which the cold made available to the cold reservoir 2 is provided exclusively when the further heat exchanger 25 is connected in between. One possibility for achieving this is shown diagrammatically in the detailed view shown in FIG. 4 and in the diagrammatic detailed view shown in FIG. 5.

Figure 4:
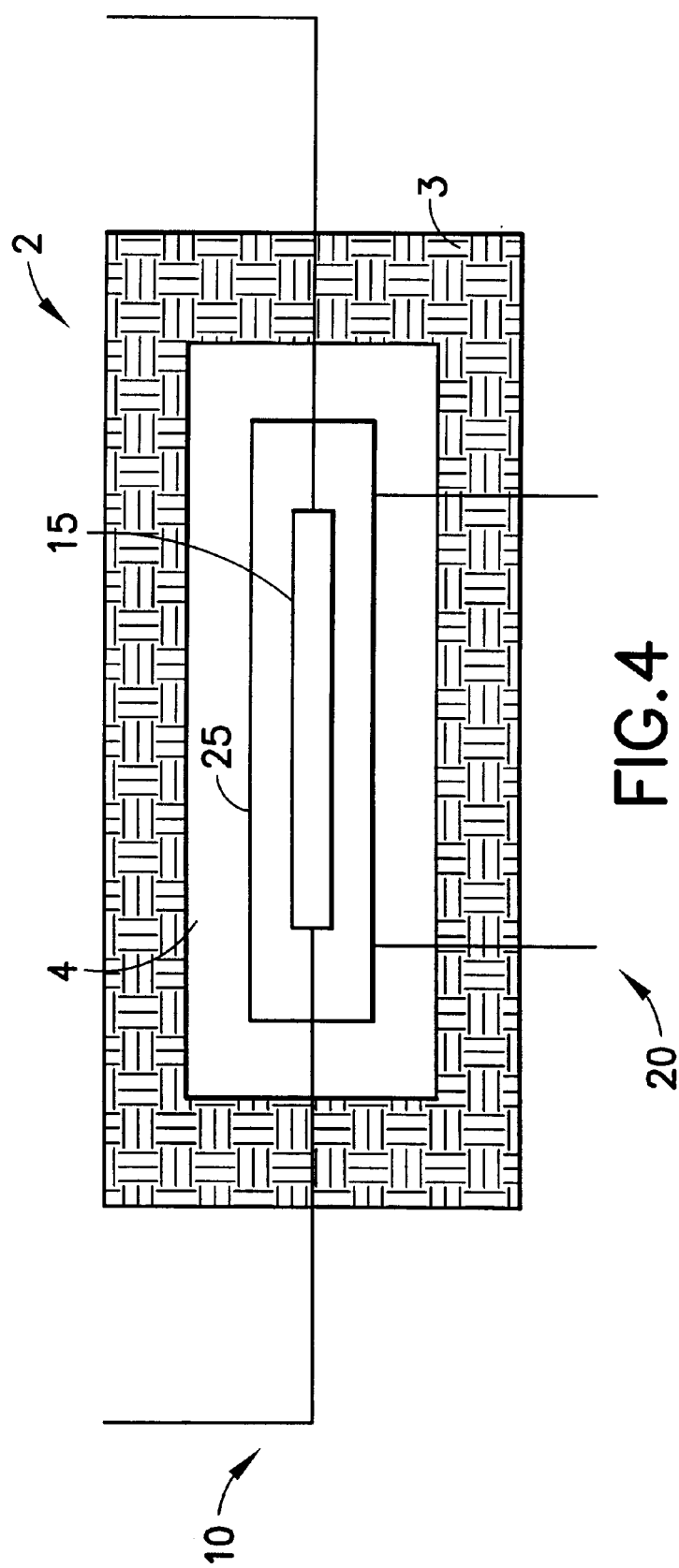
FIG. 4, in a detailed diagrammatic view, shows a cold reservoir, such as can be employed in the embodiments of FIGS. 2 and 3.

As shown in FIG. 4, the evaporator 15 in the primary circuit 10 is contained, to a certain extent embedded, entirely in the further heat exchanger 25 in the secondary circuit 20. The further heat exchanger 25 thus forms, with respect to the evaporator 15, a jacket which is in a heat-exchanging relationship with the reservoir medium 4 in the cold reservoir 2.

Figure 5:
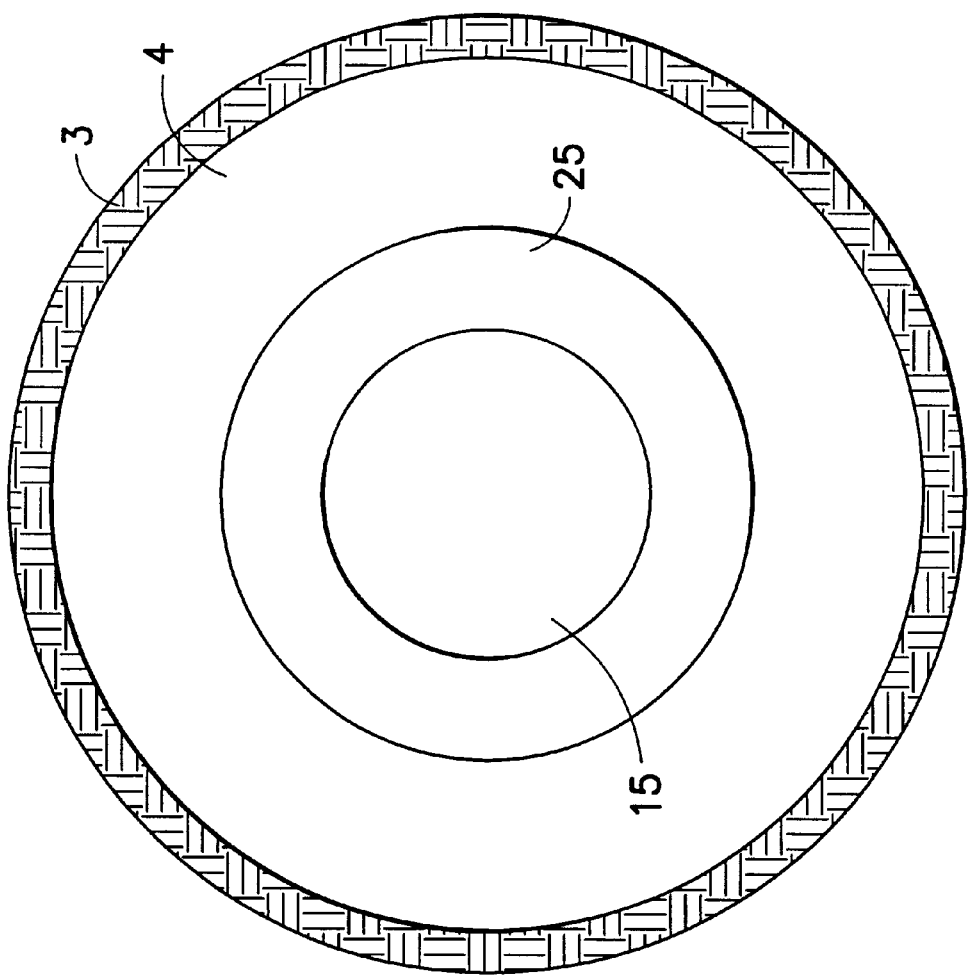
FIG. 5 shows a diagrammatic sectional view of the cold reservoir depicted in FIG. 4.

By way of example, the evaporator 15, the further heat exchanger 25 and the cold reservoir 2 could form a coaxial arrangement, as shown diagrammatically in the sectional view shown in FIG. 5. The person skilled in the art will recognize that the illustrations shown in FIGS. 4 and 5 are to be regarded as purely diagrammatic. As an example, the evaporator 15 and the further heat exchanger 25 could each be in helical form in the arrangement shown.

In order to allow better understanding of the invention, a number of operating modes will be illustrated below which can be attained with the embodiments shown in FIG. 1, FIG. 2 or FIG. 3, for example. When the vehicle is running normally, that is to say when the internal-combustion engine is operating at high engine speeds, the primary circuit 10 will provide the evaporator 15 with a great deal of cold power. The exclusive or predominant transfer of cold from the evaporator 15 to the further heat exchanger 25 in the secondary circuit 20 can cause a desired quantity of cold to be dissipated by controlling the secondary circuit 20. The remaining cold power is delivered by the further heat exchanger 25 or the additional heat exchanger 21a to the reservoir medium 4 in the cold reservoir 2, so that the latter is charged.

At low engine speeds, the secondary circuit 20 can draw cold power from the evaporator 15 in the primary circuit 10 and/or from the reservoir medium 4 in the cold reservoir 2, specifically via the additional heat exchanger 21a in the embodiment shown in FIG. 1 or via the further heat exchanger 25 in the embodiments shown in FIG. 2 and FIG. 3.

When the internal-combustion engine is switched off, the evaporator 15 in the primary circuit 10 provides no cold power, so that the additional heat exchanger 21a or the further heat exchanger 25 in the secondary circuit 20 draws the total necessary cold power from the cold reservoir 2. If, as shown in FIG. 2, the secondary circuit 20 is designed as a cold circuit, the desired cooling can still take place even if the temperature level in the cold reservoir 2 is above the desired cooling temperature. This is particularly advantageous because the insulation 3 can be correspondingly less when the design temperature of the cold reservoir 2 is relatively high.

Figure 6:
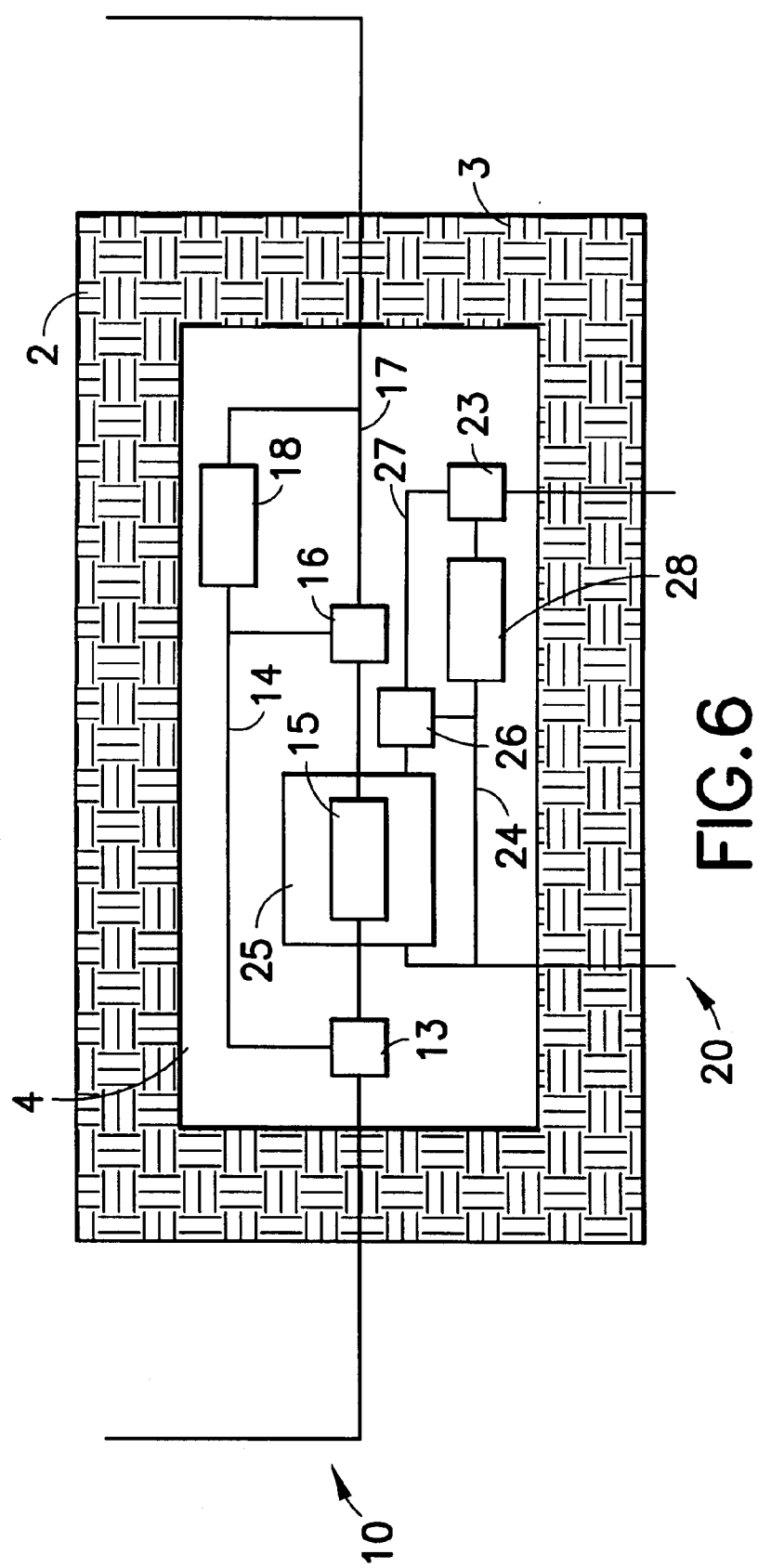
FIG. 6 shows a detailed diagrammatic view of a cold reservoir, such as can be employed in a more complex embodiment.

Finally, FIG. 6 is a diagrammatic illustration of the cold reservoir 2 in a further, somewhat more complex, embodiment. The cold reservoir 2 shown here can essentially be allocated the primary and secondary circuits 10, 20 shown in FIGS. 2 and/or 3, so that a detailed description of these circuits does not need to be repeated here. As in the previous embodiments, the cold reservoir 2 contains an arrangement of the primary evaporator 15 and of the further heat exchanger 25, in a heat-exchanging, mutual relationship, and there should also be provision for the exclusive or predominant transfer of cold from the primary evaporator 15 to the further heat exchanger 25. In addition to this arrangement 15, 25, however, the cold reservoir 2 in this embodiment contains an additional evaporator 18 in the primary circuit 10 and an additional heat exchanger 28 in the secondary circuit 20.

In the embodiment shown, bypass lines 14, 17, 24, 27 are also provided which each allow the arrangement 15, 25, the additional evaporator 18 and/or the additional heat exchanger 28 to be bypassed. The individual bypass lines can be connected via regulating elements 13, 16, 23, 26. Overall, selective fluid routing can thus be achieved for the primary circuit and/or the secondary circuit in order [lacuna] achieve the desired transfer of cold between the three fluids concerned in each case. If, by way of example, no cooling is desired or necessary in the vehicle, the regulating element 13 could route the fluid in the primary circuit 10 directly to the additional evaporator 18, which is exclusively in a heat-exchanging relationship with the cold reservoir 2, so as in this way to charge the cold reservoir 2 with practically no losses. The person skilled in the art will recognize that this allows a wide variety of fluid path routings, in accordance with design parameters, operating states and/or a given or adjustable controller. In this context, mention should additionally be made of the fact that the flow of fluid can also be split up in each case, for example between the primary evaporator 15 and the additional evaporator 18.

In the embodiment shown, the additional evaporator 18 is connected downstream of the evaporator/heat exchanger arrangement 15, 25, while the additional heat exchanger 28 is connected upstream thereof. The person skilled in the art should recognize that related arrangements are possible in this regard as desired. Additional evaporators and/or additional heat exchangers can be connected upstream and/or downstream depending on the prevailing temperature level and/or depending on the available and/or desired cooling power.

Although the present invention has been described above entirely with reference to a number of preferred embodiments, the person skilled in the art should recognize that various modifications are possible within the scope of the appended claims. By way of example, the secondary circuit could comprise more than just one heat exchanger for the vehicle or possibly a heat exchanger and an evaporator, for example combining the embodiments shown in FIGS. 2 and 3. In any case, individual features of one embodiment can be combined with features of other embodiments as desired.

In summary, it can be stated that, by combining an evaporator in the primary circuit and a further heat exchanger in the secondary circuit, possibly with the cold reservoir, an optimally efficient air conditioning installation is provided which is suitable for air conditioning while stationary, even in private cars.

What is claimed is:

1. An air conditioning installation for a motor vehicle with a cold reservoir, which can be charged with cold produced in an evaporator of a primary circuit, and with an optional heat exchanger which can deliver cold stored in the cold reservoir via a secondary circuit to the interior of the vehicle, wherein the secondary circuit contains at least one further heat exchanger, which is in a heat-exchanging relationship with the evaporator of the primary circuit and forms an evaporator/heat exchanger unit, such that the evaporator/heat exchanger unit provides air conditioning for the vehicle when the motor of the vehicle is either switched on or switched off.

2. An air conditioning installation according to claim 1, wherein the further heat exchanger is in a heat-exchanging relationship with the evaporator of the primary circuit as well as with the cold reservoir.

3. An air conditioning installation according to claim 1 wherein the evaporator of the primary circuit is in a heat-exchanging relationship with the cold reservoir, essentially with the further heat exchanger of the secondary circuit connected intermediately.

4. An air conditioning installation according to claim 1, wherein the evaporator of the primary circuit is essentially contained in the further heat exchanger of the secondary circuit, the further heat exchanger of the secondary circuit essentially being contained in the cold reservoir.

5. An air conditioning installation according to claim 1, wherein the evaporator of the primary circuit, the further heat exchanger of the secondary circuit and the cold reservoir are constructed as a unit.

6. An air conditioning installation according to claim 1, wherein the secondary circuit has a pump and/or compressor unit.

7. An air conditioning installation according to claim 6, wherein the pump and/or compressor unit is selectably driven by an electric motor.

8. An air conditioning installation according to claim 1, wherein the secondary circuit includes an expansion unit.

9. An air conditioning installation according to claim 1, wherein the heat exchanger of the secondary circuit is implemented as an evaporator for a fluid of the secondary circuit.

10. An air conditioning installation according to claim 1, wherein the primary circuit contains at least one additional evaporator, which is in a prioritized and/or exclusive heat-exchanging relationship with the cold reservoir.

11. An air conditioning installation according to claim 1, wherein the secondary circuit contains at least one additional heat exchanger, which is in prioritized and/or exclusive heat-exchanging relationship with the cold reservoir.

12. An air conditioning installation according to claim 10, wherein the primary circuit contains a bypass line for the evaporator and/or the additional evaporator, which can in particular be connected via regulating elements.

13. An air conditioning installation according to claim 11, wherein the secondary circuit contains a bypass line for the further heat exchanger and/or the additional heat exchanger, which can in particular be connected via regulating elements.

14. An air conditioning installation according to claim 1, wherein the secondary circuit can be driven in a counter-current mode in relation to the primary circuit.

15. An air conditioning installation for a motor vehicle with a cold reservoir, which can be charged with cold produced in an evaporator of a primary circuit, and with an optional heat exchanger which can deliver cold stored in the cold reservoir via a secondary circuit to the interior of the vehicle, wherein the secondary circuit contains at least one further heat exchanger, which is in a heat-exchanging relationship with the evaporator of the primary circuit and forms an evaporator/heat exchanger unit, wherein the primary circuit contains at least one additional evaporator, which is in a prioritized and/or exclusive heat-exchanging relationship with the cold reservoir; and wherein the primary circuit contains a bypass line for the evaporator and/or the additional evaporator, which can in particular be connected via regulating elements.

16. An air conditioning installation for a motor vehicle with a cold reservoir, which can be charged with cold produced in an evaporator of a primary circuit, and with an optional heat exchanger which can deliver cold stored in the cold reservoir via a secondary circuit to the interior of the vehicle, wherein the secondary circuit contains at least one further heat exchanger, which is in a heat-exchanging relationship with the evaporator of the primary circuit and forms an evaporator/heat exchanger unit, wherein the secondary circuit contains at least one additional evaporator, which is in a prioritized and/or exclusive heat-exchanging relationship with the cold reservoir; and wherein the secondary circuit contains a bypass line for the further heat exchanger and/or the additional heat exchanger, which can in particular be connected via regulating elements.

* * * * *